United States Patent
Chang

(10) Patent No.: US 8,810,539 B1
(45) Date of Patent: Aug. 19, 2014

(54) TOUCH INPUT DEVICE WITH BUTTON FUNCTION

(71) Applicant: Primax Electronics Ltd., Taipei (TW)

(72) Inventor: A-Ming Chang, Taipei (TW)

(73) Assignee: Primax Electronics Ltd., Neihu (TW)

( * ) Notice: Subject to any disclaimer, the term of this patent is extended or adjusted under 35 U.S.C. 154(b) by 10 days.

(21) Appl. No.: 13/846,643

(22) Filed: Mar. 18, 2013

(30) Foreign Application Priority Data

Jan. 28, 2013 (CN) .................... 2013 2 0045403 U

(51) Int. Cl.
*G09G 5/00* (2006.01)
*G06F 3/041* (2006.01)

(52) U.S. Cl.
CPC .................................... *G06F 3/0416* (2013.01)
USPC ........................................................ 345/173

(58) Field of Classification Search
CPC ..... G06F 3/041; G06F 3/0412; G06F 3/0416; G06F 3/048; G06F 3/0488; G06F 3/04883
USPC .................... 345/173–178; 178/18.03–18.07; 715/863, 864
See application file for complete search history.

(56) References Cited

U.S. PATENT DOCUMENTS

| | | | |
|---|---|---|---|
| 7,486,278 B2* | 2/2009 | Sun | 345/173 |
| 8,138,942 B2* | 3/2012 | Otsuka et al. | 340/815.78 |
| 2005/0052425 A1* | 3/2005 | Zadesky et al. | 345/173 |
| 2006/0022957 A1* | 2/2006 | Lee | 345/173 |
| 2007/0046644 A1* | 3/2007 | Lin et al. | 345/173 |
| 2011/0012846 A1* | 1/2011 | Zhu et al. | 345/173 |
| 2011/0254787 A1* | 10/2011 | Cheng et al. | 345/173 |
| 2012/0229396 A1* | 9/2012 | Tsai | 345/173 |
| 2013/0038551 A1* | 2/2013 | Shirai et al. | 345/173 |
| 2013/0241849 A1* | 9/2013 | Kato | 345/173 |
| 2014/0139442 A1* | 5/2014 | Clayton et al. | 345/173 |

* cited by examiner

*Primary Examiner* — Tom Sheng
(74) *Attorney, Agent, or Firm* — Kirton McConkie; Evan R. Witt

(57) ABSTRACT

A touch input device with a button function is provided. The touch input device includes a touch module, a triggering switch, a coupling module, and plural movable pads. The plural movable pads are disposed on the coupling module. The coupling module is disposed on the touch module. In addition, the coupling module may be swung relative to the touch module. When the touch module is depressed, the coupling module is pushed by the plural movable pads. Consequently, the coupling module is swung to push the triggering switch that is disposed over the coupling module. Since the plural movable pads are directly disposed on the coupling module, the force to push the triggering switch is directly transmitted from the plural movable pads to the coupling module. Under this circumstance, the touch input device can provide an enhanced tactile feel to the user.

10 Claims, 7 Drawing Sheets

TOUCH INPUT DEVICE WITH BUTTON FUNCTION

FIELD OF THE INVENTION

The present invention relates to a touch input device, and more particularly to a touch input device with a button function.

BACKGROUND OF THE INVENTION

The applications of touch input devices are very extensive. In the early stage, a touch input device is installed on a notebook computer. By operating the touch input device, the movement of a cursor may be controlled or a corresponding icon of a user interface may be clicked without the need of using a mouse to operate the notebook computer. With the advance of science and technology, a physical button may be integrated into the touch input device, so that the touch input device has a button function. Under this circumstance, it is not necessary to install plural physical buttons on the peripheral area of the touch input device. Since the physical button is integrated into the touch input device, the layout space is saved and the outward appearance is aesthetically-pleasing. Moreover, since the physical button is not installed in the touch input device, the button function can be easily implemented by simply depressing the touch input device. However, since the physical button is integrated into the touch input device, the possibility of erroneously implementing the button function will be increased during the process of operating the touch input device.

For solving the problem of erroneously implementing the button function, a conventional touch input device with a button function has been introduced into the market. Hereinafter, the structure of a touch input device with a button function will be illustrated with reference to FIGS. 1 and 2. FIG. 1 schematically illustrates a conventional touch input device with a button function. FIG. 2 is a schematic side view illustrating the touch input device of FIG. 1, in which the touch input device is depressed. Please refer to FIGS. 1 and 2. The touch input device 1 is in communication with a computer system (not shown). By operating the touch input device 1, the movement of a cursor (not shown) of the computer system may be controlled or a corresponding icon (not shown) of the computer system may be clicked. The conventional touch input device 1 comprises a casing 10, a touch plate 11, a supporting element 12, and two triggering switches 13. The touch plate 11 is disposed within the casing 10. Moreover, the touch plate 11 has a cursor control zone 111 and two button function zones 112. These two button function zones 112 are located at a lower left corner and a lower right corner of the touch plate 11, respectively. In other words, the cursor control zone 111 and the two button function zones 112 are not overlapped with each other. The two triggering switches 13 are respectively aligned with the two button function zones 112 and disposed under the two button function zones 112. The two triggering switches 13 are electrically connected with the touch plate 11. The supporting element 12 is connected to a sidewall of the touch plate 11 for supporting the touch plate 11 thereon.

For moving the cursor of the computer system, the user's finger is firstly placed on the cursor control zone 111 of the touch plate 11 and then the user's finger is moved on the cursor control zone 111, so that the cursor is correspondingly moved with the motion of the user's finger. On the other hand, the two triggering switches 13 are used as a left button and a right button, respectively. Since the cursor control zone 111 and the two button function zones 112 are not overlapped with each other, when the user's finger is moved on the touch plate 11, the possibility of erroneously triggering the triggering switches 13 by the user's finger will be minimized.

Moreover, the two triggering switches 13 of the touch input device 1 are separately triggered. For triggering one of the two triggering switches 13, the button function zone 112 of the touch plate 11 corresponding to the triggering switch 13 should be depressed in response to a strong downward force. Consequently, the touch plate 11 is subjected to deformation to push the triggering switch 13 (see FIG. 2). Under this circumstance, the triggering switch 13 is triggered to generate a button signal, and thus a corresponding button function is executed.

However, after the touch plate 11 has been used for a long time, the frequent deformation and recovery may damage the touch plate 11. If the touch plate 11 is damaged, the touch sensitivity of the touch plate 11 is deteriorated, the tactile feel of operating the touch plate 11 is impaired, and the use life of the touch plate 11 is shortened.

Therefore, there is a need of providing a touch input device with a button function in order to provide an enhanced tactile feel.

SUMMARY OF THE INVENTION

The present invention provides a touch input device with a button function in order to provide an enhanced tactile feel.

In accordance with an aspect of the present invention, there is provided a touch input device with a button function. The touch input device includes a touch input device with a button function. The touch input device includes a base member, a touch module, a triggering switch, a coupling module, and plural movable pads. The base member includes plural perforations. The plural perforations are located at a bottom side of the base member. The touch module is disposed over the base member and covers the base member. When the touch module is touched and a touched position is detected by the touch module, the touch module generates a touch signal. The triggering switch is disposed on the touch module. When the touch module is depressed, the triggering switch is triggered to generate a button signal corresponding to the touched position.

The coupling module is disposed on a lower part of the touch module. When the touch module is depressed, the coupling module is swung relative to the touch module to trigger the triggering switch. The plural movable pads are disposed on the coupling module, and penetrated through the corresponding perforations of the base member to be exposed outside the base member. When the touch module is depressed, the plural movable pads are moved relative to the corresponding perforations to push the coupling module, so that the coupling module is correspondingly swung.

In an embodiment, the coupling module includes a first coupling body and a second coupling body. The first coupling body includes plural fixing slices. The plural fixing slices are extended from a first side of the first coupling body and connected with the lower part of the touch module. The second coupling body is stacked on the first coupling body. The plural movable pads are disposed on a bottom surface of the second coupling body for protecting the first coupling body, thereby preventing deformation of the first coupling body. Moreover, the second coupling body is thicker than the first coupling body.

In an embodiment, the coupling module further includes a triggering part. The triggering part is disposed on the first coupling body and disposed under the triggering switch.

When the coupling module is swung relative to the touch module, the triggering switch is pushed by the triggering part.

In an embodiment, the coupling module further includes a triggering part. The triggering part is disposed on the first coupling body and the second coupling body. The first coupling body has a first opening under the triggering switch, and the second coupling body has a second opening aligned with the first opening. The triggering part is penetrated through the first opening and the second opening and fixed on the first coupling body and the second coupling body.

In an embodiment, the first coupling body and the second coupling body are all made of metallic material, and the plural fixing slices are integrally formed with the first coupling body. The first coupling body and the second coupling body are combined together through rivets. Moreover, the plural movable pads are made of rubbery materials.

In an embodiment, the touch input device further includes plural fixed pads. The plural fixed pads are disposed on the touch module and respectively penetrated through the corresponding perforations of the base member to be exposed outside the base member. When the base member is placed on a working surface, the plural fixed pads are contacted with the working surface.

In an embodiment, when the touch module is depressed, the plural movable pads are pushed by the working surface to be moved relative to the corresponding perforations, and the coupling module is pushed by the plural movable pads, so that the second coupling body and a second side of the first coupling body are swung relative to the touch module to push the triggering switch. As the triggering switch is pushed to be triggered, the button signal corresponding to the touched position is generated by the triggering switch.

In an embodiment, the touch module includes a sensing circuit plate and a protective cover. The sensing circuit plate is used for detecting the touched position, thereby generating the touch signal. The triggering switch is disposed on a bottom surface of the sensing circuit plate. The protective cover is used for covering the sensing circuit plate, thereby protecting the sensing circuit plate. Moreover, the bottom surface of the sensing circuit plate is exposed outside the protective cover.

In an embodiment, when the touch module is depressed and the touched position is detected by the sensing circuit plate, the button signal corresponding to the touched position is generated by the triggering switch. If the touched position is located near a left side of the touch module, the button signal is a left button signal. Whereas, if the touched position is located near a right side of the touch module, the button signal is a right button signal.

In an embodiment, the protective cover further includes plural protrusion posts. The plural protrusion posts are disposed on a lower part of the protective cover and protruded externally from the lower part of the protective cover. Moreover, the plural fixed pads are disposed on the plural protrusion posts, respectively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For eliminating the drawbacks encountered from the prior art, the present invention provides a touch input device with a button function in order to provide an enhanced tactile feel.

Figure 1:
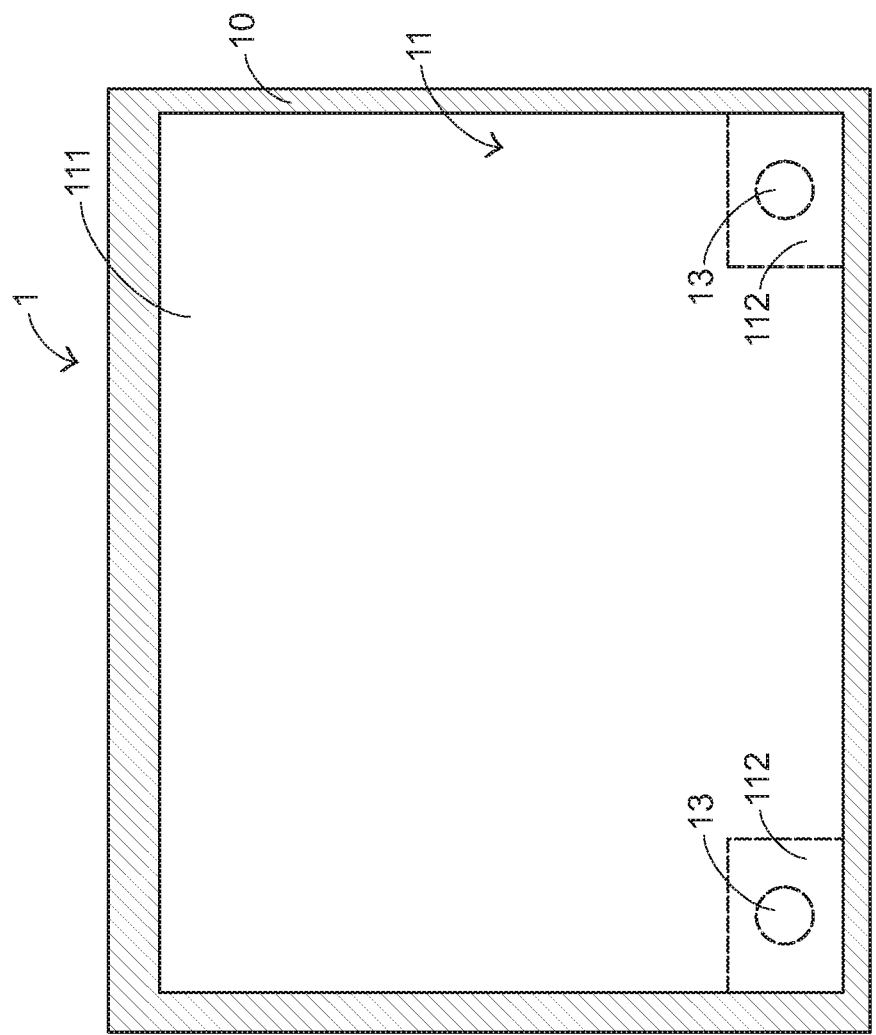
FIG. 1 schematically illustrates a conventional touch input device with a button function.
Figure 2:
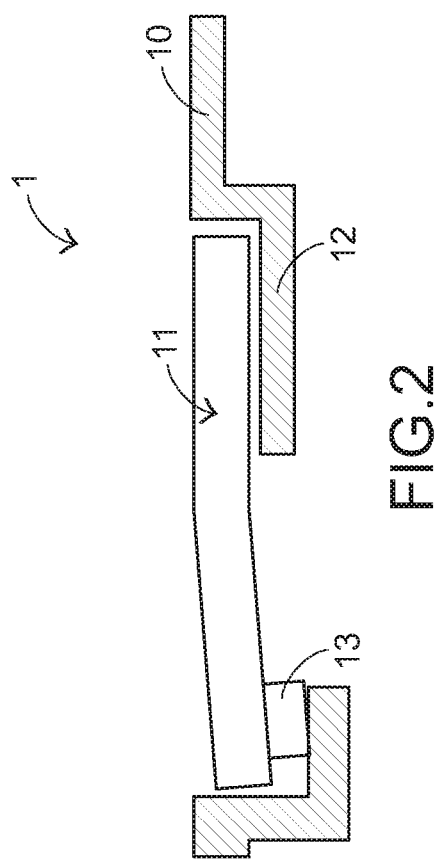
FIG. 2 is a schematic side view illustrating the touch input device of FIG. 1, in which the touch input device is depressed.
Figure 3:
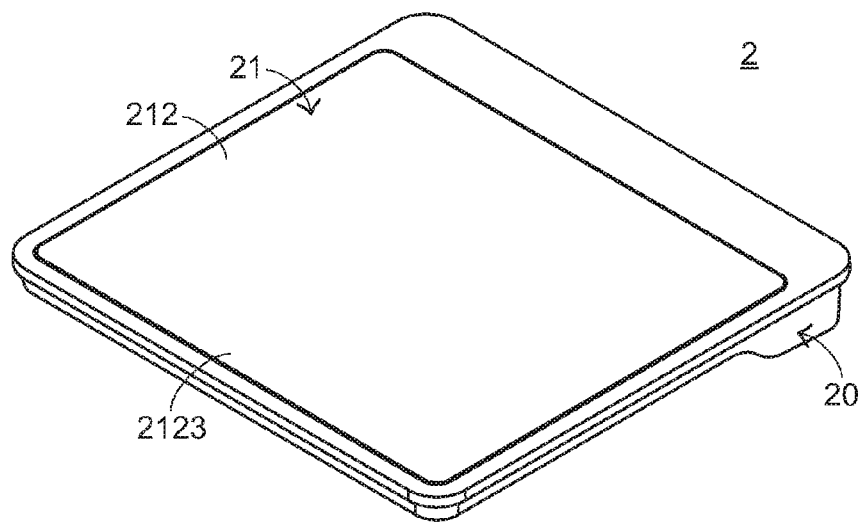
FIG. 3 is a schematic perspective view illustrating a touch input device with a button function according to an embodiment of the present invention.
Figure 4:
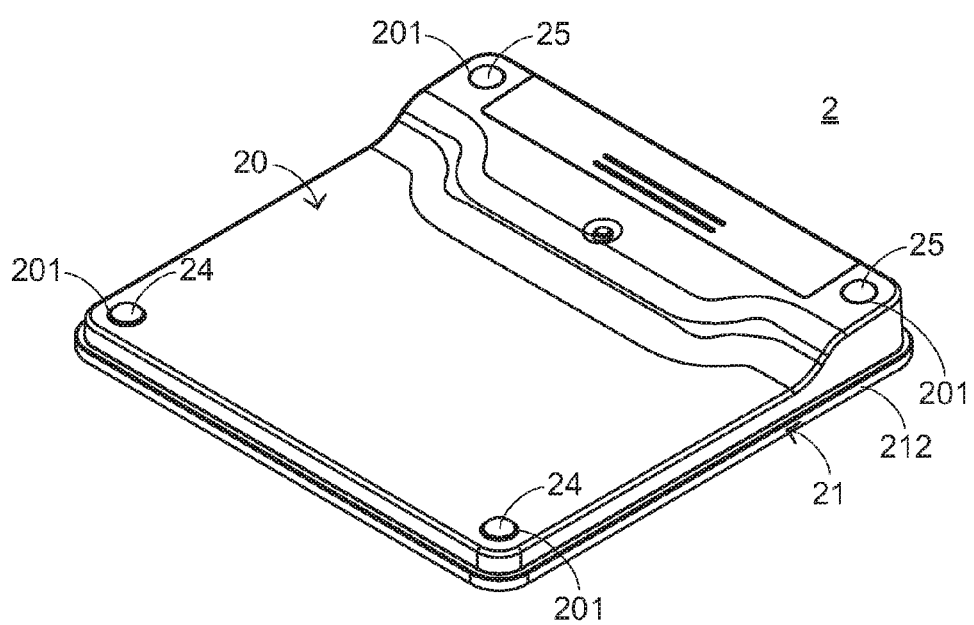
FIG. 4 is a schematic perspective view illustrating the touch input device of FIG. 3 and taken along another viewpoint.

Hereinafter, the structure of a touch input device with a button function according to an embodiment of the present invention will be illustrated with reference to FIGS. 3 and 4. FIG. 3 is a schematic perspective view illustrating a touch input device with a button function according to an embodiment of the present invention. FIG. 4 is a schematic perspective view illustrating the touch input device of FIG. 3 and taken along another viewpoint. The touch input device 2 is in communication with a computer system (not shown). By operating the touch input device 2, the movement of a cursor (not shown) of the computer system may be controlled or a corresponding icon (not shown) of the computer system may be clicked. As shown in FIGS. 3 and 4, the touch input device 2 comprises a base member 20, a touch module 21, a triggering switch 22 (see FIG. 7), a coupling module 23 (see FIG. 5), plural movable pads 24, and plural fixed pads 25. The base member 20 comprises plural perforations 201. In FIG. 4, four perforations 201 are shown. These perforations 201 are located at a bottom side of the base member 20. The touch module 21 is disposed over the base member 20 for covering the base member 20. When the touch module 21 is touched and a touched position of the touch module 21 is detected, the touch module 21 generates a touch signal. In this embodiment, the touch module 21 is a capacitive touch sensitive plate. Alternatively, in some other embodiments, the touch module 21 is a resistive touch sensitive plate.

Figure 5:
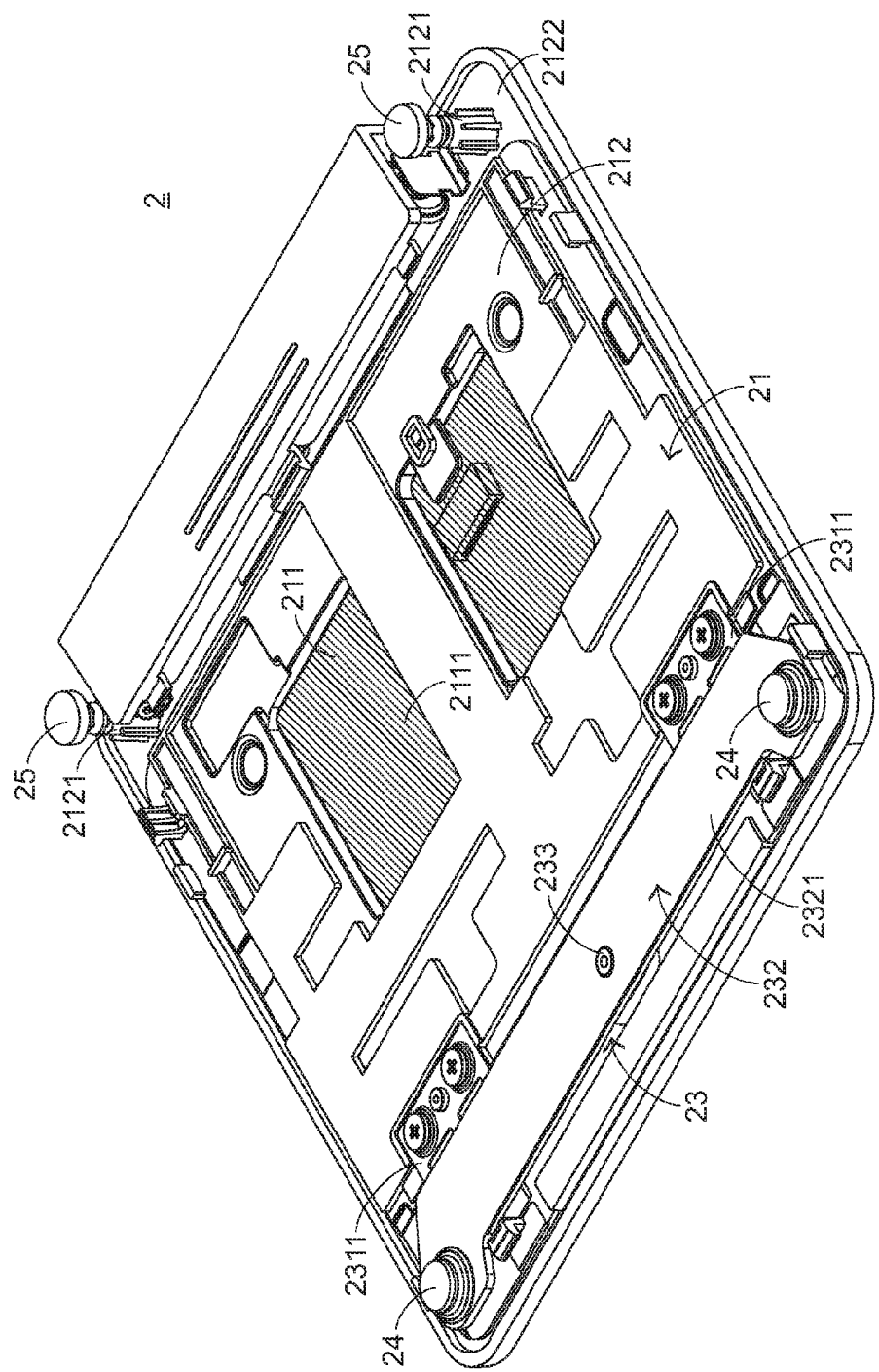
FIG. 5 is a schematic perspective view illustrating some components of the touch input device according to the embodiment of the present invention.

FIG. 5 is a schematic perspective view illustrating some components of the touch input device according to the embodiment of the present invention. Please refer to FIGS. 3, 4 and 5. The touch module 21 comprises a sensing circuit plate 211 and a protective cover 212. The sensing circuit plate 211 is used for detecting the touched position, thereby generating the touch signal. According to the touch signal, the cursor of the computer system is correspondingly moved. The protective cover 212 is used for covering the sensing circuit plate 211 in order to protect the sensing circuit plate 211. In addition, a bottom surface 2111 of the sensing circuit plate 211 is exposed outside the protective cover 212. When one or more fingers of the user are moved on a top surface 2123 of the protective cover 212, the touch position or the touched positions are detected by the sensing circuit plate 211. Consequently, one or more corresponding touch signals are generated to control the movement of the cursor of the computer system. Moreover, the protective cover 212 comprises plural protrusion posts 2121. The plural protrusion posts 2121 are disposed on a lower part 2122 of the protective cover 212, and protruded externally from the lower part 2122 of the protective cover 212. The plural fixed pads 25 are disposed on the plural protrusion posts 2121, respectively. Moreover, the plural fixed pads 25 are penetrated through the corresponding perforations 201 to be exposed outside the base member 20 (see FIG. 4).

Please refer to FIG. 5 again. The coupling module 23 is disposed on the lower part 2122 of the protective cover 212 of the touch module 21. When the touch module 21 is depressed, the coupling module 23 is swung relative to the touch module 21 to trigger the triggering switch 22. The plural movable pads 24 are disposed on the coupling module 23. Moreover, the plural movable pads 24 are penetrated through the corresponding perforations 201 to be exposed outside the base member 20. When the touch module 21 is depressed, the plural movable pads 24 are moved relative to the corresponding perforations 201. Consequently, the coupling module 23 is pushed by the plural movable pads 24 to be swung. In this embodiment, all of the plural movable pads 24 and the plural fixed pads 25 are made of rubbery materials.

Figure 6:
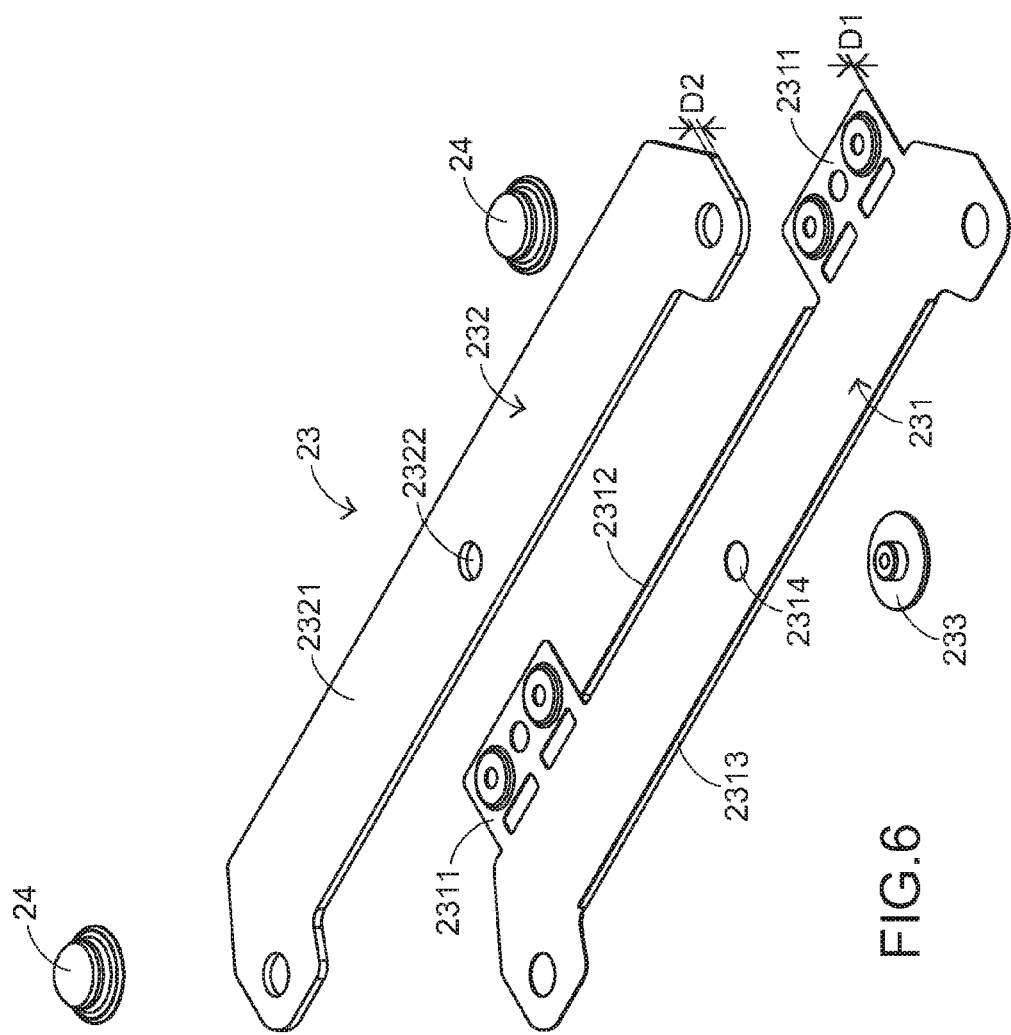
FIG. 6 is a schematic exploded view illustrating the coupling module of the touch input device according to the embodiment of the present invention.

FIG. 6 is a schematic exploded view illustrating the coupling module of the touch input device according to the embodiment of the present invention. Please refer to FIGS. 5 and 6. The coupling module 23 comprises a first coupling body 231 and a second coupling body 232. The first coupling body 231 comprises plural fixing slices 2311. In FIG. 6, two fixing slices 2311 are shown. The plural fixing slices 2311 are extended from a first side 2312 of the first coupling body 231 and connected with the lower part 2122 of the protective cover 212. The second coupling body 232 is stacked on the first coupling body 231. Moreover, the plural movable pads 24 are disposed on a bottom surface 2321 of the second coupling body 232 for protecting the first coupling body 231 in order to prevent deformation of the first coupling body 231. In this embodiment, the first coupling body 231 and the second coupling body 232 are made of metallic material. Moreover, the plural fixing slices 2311 are integrally formed with the first coupling body 231. The first coupling body 231 and the second coupling body 232 are combined together through rivets (not shown). The plural fixing slices 2311 are fixed on the lower part 2122 of the protective cover 212 through screws. Alternatively, in some other embodiments, the first coupling body and the second coupling body may be combined together through other connecting means, and the plural fixing slices may be fixed on the lower part of the protective cover through other connecting means.

More especially, the thickness D2 of the second coupling body 232 is larger than the thickness D1 of the first coupling body 231. Since the thickness D1 of the first coupling body 231 is smaller and the first coupling body 231 has the metallic properties, the plural fixing slices 2311 that are connected with the first coupling body 231 can provide bending elasticity. That is, the plural fixing slices 2311 may function as a hinge device. Due to the function of the hinge device provided by the plural fixing slices 2311, the coupling module 23 may be swung relative to the touch module 21. Moreover, due to the elasticity of the metallic material of the coupling module 23, the coupling module 23 may provide a feedback tactile feel during the coupling module 23 is swung. On the other hand, since the thickness D1 of the first coupling body 231 is smaller, the first coupling body 231 is easily subjected to deformation. In this embodiment, the second coupling body 232 is stacked on a second side 2313 of the first coupling body 231. Since the thickness D2 of the second coupling body 232 is larger, the second coupling body 232 can provide stronger rigidity. Consequently, after the first coupling body 231 and the second coupling body 232 are stacked on each other to be collaboratively defined as the coupling module 23, the first coupling body 231 is protected by the second coupling body 232, and thus the possibility of causing deformation of the first coupling body 231 is minimized.

Figure 7:
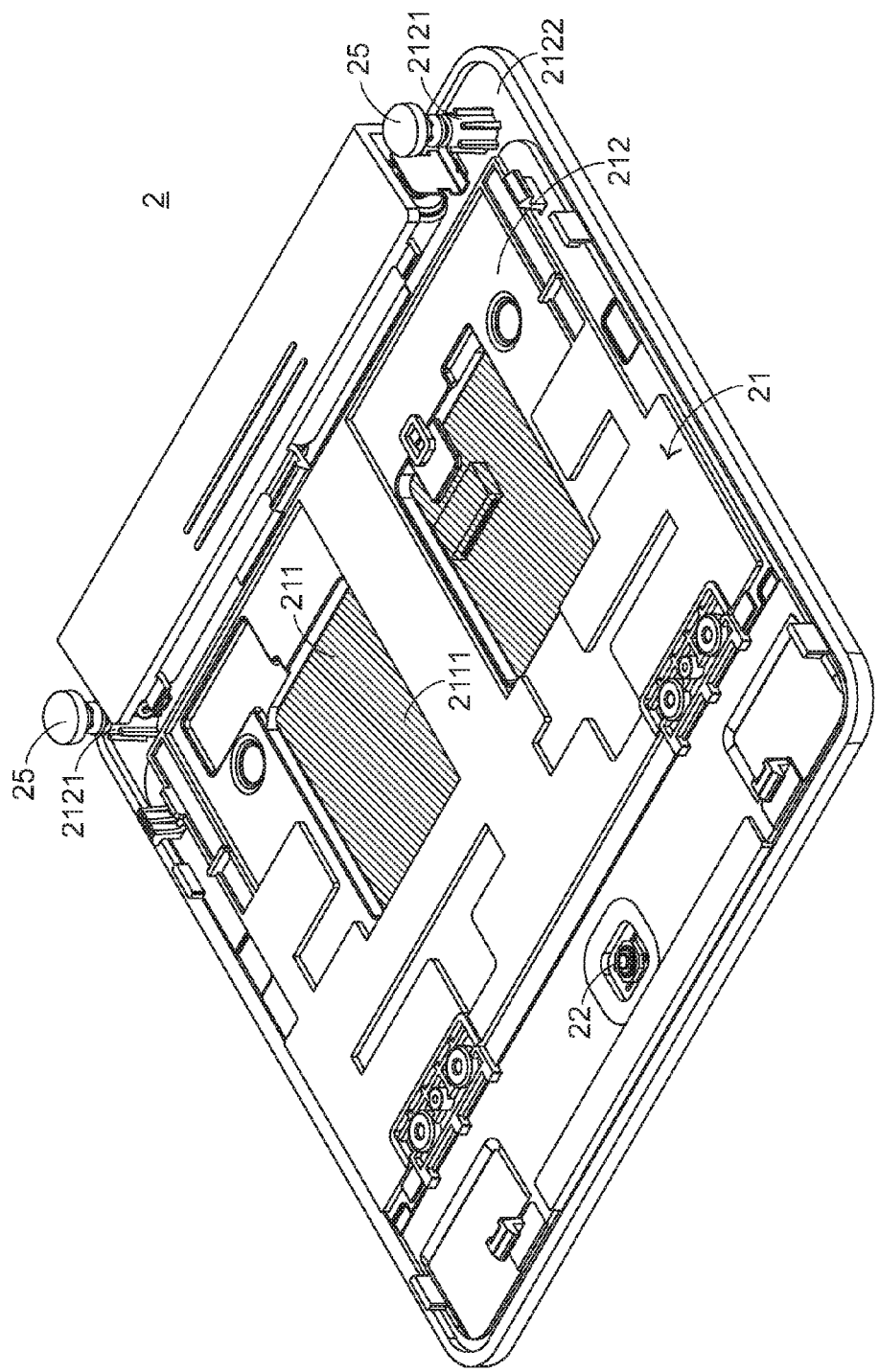
FIG. 7 is a schematic perspective view illustrating the touch module and the triggering switch of the touch input device according to the embodiment of the present invention.

FIG. 7 is a schematic perspective view illustrating the touch module and the triggering switch of the touch input device according to the embodiment of the present invention. Please refer to FIGS. 3 and 7. In FIG. 7, the triggering switch 22 is shown. The triggering switch 22 is disposed on the bottom surface 2111 of the sensing circuit plate 211 of the touch module 21. When the touch module 21 is depressed by the user, a button signal corresponding to the touched position is generated by the triggering switch 22. That is, when the touch module 21 is depressed, the touched position on a top surface 2123 of the protective cover 212 is detected by the sensing circuit plate 211, so that the button signal corresponding to the touched position is generated by the triggering switch 22. If the touched position is located near a left side of the touch module 21, the button signal generated by the triggering switch 22 is a left button signal. The left button signal is identical to the button signal that is generated by clicking the left button of the conventional mouse. If the touched position is located near a right side of the touch module 21, the button signal generated by the triggering switch 22 is a right button signal. The right button signal is identical to the button signal that is generated by clicking the right button of the conventional mouse.

Please refer to FIG. 6 again. The coupling module 23 further comprises a triggering part 233. The triggering part 233 is disposed on the first coupling body 231 and the second coupling body 232. The first coupling body 231 has a first opening 2314, which is disposed under the triggering switch 22. When the coupling module 23 is swung relative to the touch module 21, the triggering part 233 is moved upwardly to push the triggering switch 22. Moreover, the second coupling body 232 has a second opening 2322. The second opening 2322 is aligned with the first opening 2314. The triggering part 233 is sequentially penetrated through the first opening 2314 and the second opening 2322 so as to be fixed on the first coupling body 231 and the second coupling body 232. In this embodiment, the triggering part 233 is made of a plastic material.

It is noted that numerous modifications and alterations of the triggering part may be made while retaining the teachings of the invention. For example, in some embodiments, the triggering part is disposed on the first coupling body, and extended from the first coupling body. Moreover, the triggering part is integrally formed with the first coupling body. That is, the triggering part is also made of a metallic material. When the coupling module is swung relative to the touch module, the triggering part under the triggering switch is moved upwardly to push the triggering switch. Consequently, the triggering switch is triggered to generate a corresponding button signal.

Figure 8:
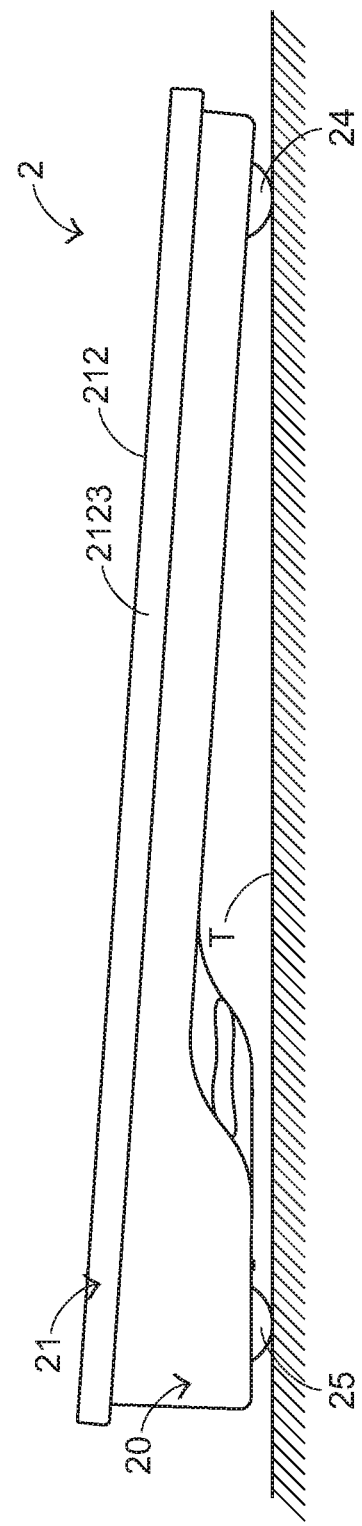
FIG. 8 is a schematic side view illustrating the touch input device according to the embodiment of the present invention.

Now, please refer to FIGS. 5 and 8. FIG. 8 is a schematic side view illustrating the touch input device according to the embodiment of the present invention. As shown in FIG. 8, the base member 20 of the touch input device 2 is placed on a working surface T. In addition, the plural movable pads 24 and the plural fixed pads 25 are all contacted with the working surface T. For implementing the button function, the user's finger may depress the top surface 2123 of the protective cover 212 of the touch module 21. Consequently, the plural movable pads 24 are pushed by the working surface T to be moved relative to the corresponding perforations 201 of the base member 20. Moreover, since the coupling module 23 is pushed by the plural movable pads 24, the second coupling body 232 and the second side 2312 of the first coupling body 231 are swung relative to the touch module 21. Under this circumstance, the triggering part 233 is moved upwardly to push the triggering switch 22, and thus the button signal corresponding to the touched position is generated by the triggering switch 22. For example, the button signal is a left button signal or a right button signal. According to the button signal, a function of clicking a corresponding icon of the computer system is executed.

When the top surface 2123 of the protective cover 212 is no longer depressed by the user's finger, in response to the bending elasticity of the plural fixing slices 2311 fixed on the lower part 2122 of the protective cover 212, the coupling module 23 is swung relative to the touch module 21. Under this circumstance, the triggering part 233 is separated from the triggering switch 22, so that the triggering switch 22 is no longer pushed by the triggering part 233. Moreover, as the coupling module 23 is swung, the plural movable pads 24 are moved relative to the corresponding perforations 201 of the base member 20. Consequently, the plural movable pads 24 are returned to their original positions where the touch module 21 is not depressed.

From the above descriptions, the present invention provides a touch input device with a button function. In the touch input device of the present invention, the plural movable pads are directly disposed on the coupling module. The coupling module is made of a metallic material and used for controlling the movement of the plural movable pads. Moreover, since the force to push the triggering switch is directly transmitted from the plural movable pads to the coupling module, the coupling module can be smoothly swung. Moreover, due to the bending elasticity of the thin metal part, the coupling module can be smoothly swung relative to the touch module in order to provide an enhanced tactile feel. Moreover, due to the rigidity of the thick metal, the thicker second coupling body may be stacked on the first coupling body in order to increase the thickness of the coupling module. Under this circumstance, the possibility of causing deformation of the first coupling body is minimized.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch input device with a button function, said touch input device comprising:
    a base member comprising plural perforations, wherein said plural perforations are located at a bottom side of said base member;
    a touch module disposed over said base member and covering said base member, wherein when said touch module is touched and a touched position is detected by said touch module, said touch module generates a touch signal;
    a triggering switch disposed on said touch module, wherein when said touch module is depressed, said triggering switch is triggered to generate a button signal corresponding to said touched position;
    a coupling module disposed on a lower part of said touch module, wherein when said touch module is depressed, said coupling module is swung relative to said touch module to trigger said triggering switch; and
    plural movable pads disposed on the coupling module, and penetrated through said corresponding perforations of said base member to be exposed outside said base member, wherein when said touch module is depressed, said plural movable pads are moved relative to said corresponding perforations to push said coupling module, so that said coupling module is correspondingly swung.

2. The touch input device according to claim 1, wherein said coupling module comprises:
    a first coupling body comprising plural fixing slices, wherein said plural fixing slices are extended from a first side of said first coupling body and connected with said lower part of said touch module; and
    a second coupling body stacked on said first coupling body, wherein said plural movable pads are disposed on a bottom surface of said second coupling body for protecting said first coupling body, thereby preventing deformation of said first coupling body, wherein said second coupling body is thicker than said first coupling body.

3. The touch input device according to claim 2, wherein said coupling module further comprises a triggering part, wherein said triggering part is disposed on said first coupling body and disposed under said triggering switch, wherein when said coupling module is swung relative to said touch module, said triggering switch is pushed by said triggering part.

4. The touch input device according to claim 2, wherein said coupling module further comprises a triggering part, wherein said triggering part is disposed on said first coupling body and said second coupling body, wherein said first coupling body has a first opening under said triggering switch, and said second coupling body has a second opening aligned with said first opening, wherein said triggering part is penetrated through said first opening and said second opening and fixed on said first coupling body and said second coupling body.

5. The touch input device according to claim 2, wherein said first coupling body and said second coupling body are all made of metallic material, and said plural fixing slices are integrally formed with said first coupling body, wherein said first coupling body and said second coupling body are combined together through rivets, wherein said plural movable pads are made of rubbery materials.

6. The touch input device according to claim 2, further comprising plural fixed pads, wherein said plural fixed pads are disposed on said touch module and respectively penetrated through said corresponding perforations of said base member to be exposed outside said base member, wherein when said base member is placed on a working surface, said plural fixed pads are contacted with said working surface.

7. The touch input device according to claim 6, wherein when said touch module is depressed, said plural movable pads are pushed by said working surface to be moved relative to said corresponding perforations, and said coupling module is pushed by said plural movable pads, so that said second coupling body and a second side of said first coupling body are swung relative to said touch module to push said triggering switch, wherein as said triggering switch is pushed to be triggered, said button signal corresponding to said touched position is generated by said triggering switch.

8. The touch input device according to claim 6, wherein said touch module comprises:

a sensing circuit plate for detecting the touched position, thereby generating said touch signal, wherein said triggering switch is disposed on a bottom surface of said sensing circuit plate; and a protective cover for covering said sensing circuit plate, thereby protecting said sensing circuit plate, wherein said bottom surface of said sensing circuit plate is exposed outside said protective cover.

9. The touch input device according to claim 8, wherein when said touch module is depressed and said touched position is detected by said sensing circuit plate, said button signal corresponding to said touched position is generated by said triggering switch, wherein if said touched position is located near a left side of said touch module, said button signal is a left button signal, wherein if said touched position is located near a right side of said touch module, said button signal is a right button signal.

10. The touch input device according to claim 8, wherein said protective cover further comprises plural protrusion posts, wherein said plural protrusion posts are disposed on a lower part of said protective cover and protruded externally from said lower part of said protective cover, wherein said plural fixed pads are disposed on said plural protrusion posts, respectively.

* * * * *